(12) United States Patent
Kratmann et al.

(10) Patent No.: US 12,427,588 B2
(45) Date of Patent: Sep. 30, 2025

(54) GUIDING TOOL FOR A SURFACE TRIMMING DEVICE AND TRIMMING ARRANGEMENT

(71) Applicant: Siemens Gamesa Renewable Energy A/S, Brande (DK)

(72) Inventors: Kasper Koops Kratmann, Horsens (DK); Jason Stege, Vejle (DK)

(73) Assignee: Siemens Gamesa Renewable Energy, A/S Brande (DK)

( * ) Notice: Subject to any disclaimer, the term of this patent is extended or adjusted under 35 U.S.C. 154(b) by 1297 days.

(21) Appl. No.: 15/734,274

(22) PCT Filed: May 23, 2019

(86) PCT No.: PCT/EP2019/063343
§ 371 (c)(1),
(2) Date: Dec. 2, 2020

(87) PCT Pub. No.: WO2019/238377
PCT Pub. Date: Dec. 19, 2019

(65) Prior Publication Data
US 2021/0213544 A1    Jul. 15, 2021

(30) Foreign Application Priority Data
Jun. 12, 2018  (EP) .................................... 18177215

(51) Int. Cl.
*B23C 3/12* (2006.01)
(52) U.S. Cl.
CPC .................................... *B23C 3/126* (2013.01)
(58) Field of Classification Search
CPC .. B23Q 9/0007; B23Q 9/0014; B23Q 9/0028; B23C 3/28; B23C 2220/366;
(Continued)

(56) References Cited

U.S. PATENT DOCUMENTS 800,962 A * 10/1905 Wattles ................... B24B 7/188
451/352
851,702 A * 4/1907 Spietschka .............. A47L 13/02
15/23
(Continued)

FOREIGN PATENT DOCUMENTS

CN  202894940 U  4/2013
CN  104010763 A  8/2014
(Continued)

OTHER PUBLICATIONS

International Search Report and Written Opinion of the International Searching Authority issued Aug. 20, 2019 for Application No. PCT/EP2019/063343.
(Continued)

*Primary Examiner* — Nicole N Ramos
(74) *Attorney, Agent, or Firm* — Schmeiser, Olsen & Watts, LLP (57) ABSTRACT

Provided is a guiding tool for a surface trimming device, including a main body with a front side base portion and a backside base portion, which are connected by at least one connection portion of the main body, wherein the main body exhibits a recess on a bottom side between the front side base portion and the backside base portion, wherein the main body includes a fixation device on a top side of the main body opposing the recess, wherein a surface trimming device is mountable to the fixation device in such manner that a movable device or trimmer of the surface trimming device is located in the recess between the front side base portion and the back side base portion.

13 Claims, 4 Drawing Sheets

(58) Field of Classification Search
CPC ....... B23C 2215/52; Y10T 409/306384; Y10T 409/306496; Y10T 409/306272; Y10T 409/306608; Y10T 409/306552
See application file for complete search history.

(56) References Cited

U.S. PATENT DOCUMENTS

| | | | | |
|---|---|---|---|---|
| 1,975,930 | A * | 10/1934 | Errig | B29D 30/68 82/105 |
| 2,272,737 | A * | 2/1942 | Chapman | B23D 79/02 409/300 |
| 2,373,267 | A * | 4/1945 | Schultz | B23Q 3/002 409/134 |
| 2,644,348 | A * | 7/1953 | Thomas | B23B 47/28 408/110 |
| 2,987,970 | A * | 6/1961 | Watson | B23C 1/20 409/184 |
| 3,259,021 | A * | 7/1966 | Appleton | B23K 9/032 104/118 |
| 3,421,411 | A * | 1/1969 | Lowry | B23D 79/02 409/181 |
| 3,456,555 | A * | 7/1969 | Dunlap | B23D 79/02 451/237 |
| 4,022,106 | A * | 5/1977 | Kile | B23C 1/20 409/235 |
| 4,434,824 | A * | 3/1984 | Bussey | B23Q 9/0078 144/144.1 |
| 4,960,352 | A * | 10/1990 | Kishi | B23C 5/22 407/30 |
| 5,106,243 | A * | 4/1992 | Hunt | B23C 1/20 144/24.05 |
| 5,727,913 | A | 3/1998 | Naim | |
| 6,645,048 | B1 * | 11/2003 | Linderholm | B64F 5/305 451/127 |
| 7,469,735 | B2 * | 12/2008 | Brown | B29C 70/384 156/392 |
| 12,011,771 | B2 * | 6/2024 | Koike | B23C 1/20 |
| 2013/0161297 | A1 | 6/2013 | Czerner | |
| 2014/0260849 | A1 * | 9/2014 | Johnson | F03D 3/0436 83/743 |
| 2014/0273755 | A1 | 9/2014 | Warner et al. | |
| 2017/0136556 | A1 | 5/2017 | Clossen-von Lanken Schulz et al. | |
| 2022/0193797 | A1 * | 6/2022 | Koike | B23C 1/20 |

FOREIGN PATENT DOCUMENTS

| | | |
|---|---|---|
| CN | 104625913 A | 5/2015 |
| CN | 204470674 U | 7/2015 |
| CN | 205798542 U | 12/2016 |
| DE | 102014224920 A1 | 6/2016 |
| DE | 102015222529 A1 | 5/2017 |
| GB | 2136566 A | 9/1984 |
| JP | 2002307282 A | 10/2002 |
| JP | 2010076917 A | 4/2010 |
| KR | 101416221 B1 | 7/2014 |
| WO | 2009069206 A1 | 6/2009 |

OTHER PUBLICATIONS

European Search Report and Written Opinion of the European Searching Authority issued Dec. 12, 2018 for Application No. 18177215.3.

* cited by examiner

GUIDING TOOL FOR A SURFACE TRIMMING DEVICE AND TRIMMING ARRANGEMENT

CROSS-REFERENCE TO RELATED APPLICATIONS

This application claims priority to PCT Application No. PCT/EP2019/063343, having a filing date of May 23, 2019, which is based off of EP Application No.18177215.3, having a filing date of Jun. 12, 2018, the entire contents both of which are hereby incorporated by reference.

FIELD OF TECHNOLOGY

The following relates to a guiding tool for a surface trimming device and a trimming arrangement.

BACKGROUND

Wind turbine blades, and especially the leading edges of wind turbine blades, can suffer from erosion over their lifetime. This erosion can occur particularly when particles such as rain, hail, sand, or dust impact on the wind turbine blade when it is rotating at high speed. The erosion may cause structural damage to the wind turbine blade and reduces the performance of the airfoil of the wind turbine blade. It is therefore important to provide a means of repairing and protecting the leading edge of the wind turbine blade.

It is known to provide erosion protective shells made of an elastomeric material for erosion protection and for the repair of damaged wind turbine blades. These protective shells may be attached to a wind turbine blade by using a heat-activatable adhesive sheet and a heating blanket for curing the heat-activatable adhesive sheet. To maintain the aerodynamic properties of the wind turbine blade, the edges of the protective shell added to the wind turbine blade are filled with additional material to obtain a smooth surface of the wind turbine blade. However, only a comparable small height difference has to be filled with the edge filling material when comparatively thin protective shells of an elastomeric material are used. In this case, the edge filling is not very practical, since the thin layer of edge filling material will be decomposed very fast during operation of the wind turbine blade. As an alternative, a trimming or a grinding of the edges of the protective shell can be performed to obtain a smooth surface of the wind turbine blade. However, a trimming or a grinding bears the risk of damaging accidentally the underlying surface of the wind turbine blade.

SUMMARY

An aspect relates to provide a tool for a surface trimming device that enables the creation of a flat surfaces and prevents the occurrence of damage to a workpiece, in particular a wind turbine blade.

According to embodiments of the invention, this aspect is achieved by a guiding tool for a surface trimming device, which comprises a main body with a front side base portion and a backside base portion, which are connected by at least one connection portion of the main body, wherein the main body exhibits a recess on a bottom side between the front side base portion and the backside base portion, wherein the main body comprises a fixation means or fixation device on a top side of the main body opposing the recess, wherein a surface trimming device is mountable to the fixation means or fixation device in such manner that a movable trimming means or trimming device or trimmer of the surface trimming device trimmer is located in the recess between the front side base portion and the backside base portion.

The guiding tool can be coupled to a surface trimming device, in particular to a surface trimming device for manual operation like a grinding machine, a planning machine, an edge router, a palm router, a wood planner or the like. The guiding tool comprises a recess between the front side base portion and the backside base portion of the main body, wherein the movable trimming means or trimming device or trimmer of a surface trimming device mounted to the fixation means or fixation device of the guiding tool extends into the recess between the front side base portion and the backside base portion. The surface trimming device can be mounted to the guiding tool using the fixation means or fixation device, which enables a stable coupling between the guiding tool and the mounted surface trimming device. The front side base portion and the backside base portion of the main body are connected by at least one connection portion of the main body forming a stable frame surrounding at least partly the moveable trimming means or trimming device or trimmer of the surface trimming device in the recess. In particular, the front side base portion and the backside base portion are wider in a lateral direction than the trimming means or trimming device or trimmer, so that an unintended contact of the trimming means or trimming device or trimmer at front side, backside, and in the lateral direction of the guiding tool to a surface of the workpiece can be prevented. During operation of the surface trimming device mounted to the guiding tool, an unintended contact to a lateral surrounding of the trimming device can be prevented also by the at least one connection portion of the main body. A contact between the moveable trimming means or trimming device or trimmer and the surface of the workpiece for trimming or grinding is only possible in an area underneath the trimming means or trimming device or trimmer or underneath the recess, respectively.

During edge trimming of a protective shell attached to a leading edge of the wind turbine blade, the front side base portion and the backside base portion of the guiding tool prevent a contact between the movable trimming means or trimming device or trimmer of the surface trimming device and the surface of a wind turbine blade. Therefore, the guiding tool prevents the occurrence of damage on the surface of the wind turbine blade during the edge trimming.

The front side base portion and the backside base portion each comprises a left and a right contact portion for contacting a surface of a workpiece during trimming. All four contact portions can be arranged for example in the corners of a rectangle, so that a main body with a substantially rectangular top side or bottom side, respectively, is obtained. The recess between the front side portion and the backside portion of the main body is therefore surrounded by the left and the right contact portions of both the front side base portion and the backside portion and/or the at least one connection portion, so that a contact between the movable trimming means or trimming device or trimmer of a surface trimming device mounted to the guiding tools and an underlying workpiece, especially a wind turbine blade with an attached edge protection shell, is only possible on the bottom side of the main body in between the contact portions. Unintended damage by lateral bumping of the surface trimming device during surface trimming is therefore effectively prevented. For enabling a surface trimming or a removal of material from the underlying surface, respectively, both the front side base portion and the backside base portion contact the underlying surface only with its left and right contact portions, so that in between the left and the right contact portion of both the front side base portion and the backside base portion, a gap is formed between the base portions and the surface of the workpiece. Due to this gap, only a protruding part of the surface, especially an edge or a ridge of the surface, can come into contact with the movable trimming means or trimming device or trimmer of the surface trimming device leading to a flattening of the surface or a surface trimming, respectively.

In an embodiment of the invention, the fixation means or fixation device is height-adjustable, so that a distance between an operative trimming portion of the movable trimming means or trimming device or trimmer and the lower edges of the front side base portion and the backside base portion is adjustable. The lower edges of the front side base portion and the backside base portion are the edges of the front side base portion and the backside base portion on the bottom side of the main body, which are in contact with the surface of the workpiece during trimming. In case that the front side base portion and the backside base portion each comprise a left and a right contact portion, the lower edges of the front side base portion and the backside base portion are the lower edges of the contact portions, wherein the distance between the operative trimming portion of the movable trimming means or trimming device or trimmer and the lower edges can be adjusted by the fixation means or fixation device. In this context, the operative trimming portion of the movable trimming means or trimming device or trimmer describes the portion of the movable trimming means or trimming device or trimmer which is used for material removal and/or for material ablation. Depending on the trimming means or trimming device or trimmer, this can be for instance a blade, a portion covered with abrasive paper, the tip of a milling head and so on. By adjusting the distance between the operative trimming portion of the movable trimming means or trimming device or trimmer and the lower edges of the front side base portion and the backside base portion, the amount of material which is removed during the operation of the surface trimming device can be adjusted by adapting the height-adjustable fixation means or fixation device.

The fixation means or fixation device is adaptable for fixation of different trimming devices. The fixation means or fixation device can comprise for instance an adaptable clamp, wherein a diameter of a clamp can be adjusted to a housing or part of a housing of a certain trimming device, so that different types of trimming devices can be mounted to the guiding tool. It is also possible that the fixation means or fixation device comprises one or more brackets, jokes, and/or frames, which are adjustable enabling the fixation of different types of surface trimming devices.

In an embodiment of the invention, the front side base portion and the backside base portion each comprises at least one first guiding roller. The first guiding roller facilitates the guiding during surface trimming by reducing the friction between the guiding tool and the surface of the workpiece. The first guiding roller can be cylindrical, conical, a wheel, a ball bearing or the like. Especially, two first guiding rollers can be provided on each of the front side base portion and the backside base portion, so that a total of four first guiding rollers is provided. In particular, each of the two first guiding rollers of the front side base portion or the backside base portion, respectively, can form a left contact portion or a right contact portion of the front side base portion or the backside base portion, respectively, so that the front side base portion and/or the backside base portion contacts the surface of the workpiece each with the two first guiding rollers, wherein in between a gap is provided between the front side base portion or the backside base portion, respectively, and the surface of the workpiece.

The main body comprises at least one guiding means comprising at least one second guiding roller attached to a connection arm of the guiding means, so that the guiding roller is arranged distanced to the main body. With the at least one second guiding roller of the at least one guiding means, an additional guiding of the guiding tool is obtained increasing the precision of the surface trimming. The second guiding roller can for instance roll along an edge or a corner of the workpiece, so that a precise positioning and/or a precise guiding during a movement of the guiding tool on the workpiece is enabled. The guiding by the second guiding roller can occur in a distance from the guiding tool, since the second guiding roller is attached to a connection arm of the guiding means allowing a guiding on structures which are distanced from the surface area, in which the trimming occurs.

In an embodiment, the first guiding rollers are rotatable around first parallel axes and the second guiding roller is rotatable around a second axis arranged at an angle to the first axes. The first axes of the first guiding rollers, which are attached to the front side base portion and the backside base portion of the main body, are parallel. The second guiding roller of the guiding means is rotatable around a second axis, which is arranged at an angle to the parallel first axes of the first guiding rollers. This enables for instance a guiding by a second guiding roller on the leading edge of a wind turbine blade, wherein the first guiding rollers are in contact with the surface of the wind turbine blade. By the second guiding roller rotatable around the second axis arranged at an angle to the first axis, a guiding of the second guiding roller can occur for instance on structures protruding from a surface, on which the guiding tool is guided by the first guiding rollers. The angle of the second axis thereby corresponds to the angle between the surface and the protruding structure.

The connection arm is adaptable for adjusting the distance between the at least one second guiding roller and the main body and/or for adjusting the angle between the second axis or axes of the at least one second guiding roller and the first axes. Both the distance and the angle of the connection arm of the guiding means is adjustable, so that an adaption of the guiding means in dependence of the workpiece and the structure suitable for guiding can be enabled. For instance, by adapting the connection arm, an adjustment of the guiding tool can be performed for different types of wind turbine blades differing in diameter and/or in a curvature of the leading edge, so that the guiding tool can be used for surface trimming on different types of wind turbine blades.

A trimming arrangement according to embodiments of the invention comprises a guiding tool according to embodiments of the invention and a trimming device. In particular, the trimming device is mountable to the guiding tool to obtain a trimming arrangement, which can be used for instance for surface trimming of a wind turbine blade.

The trimming device comprises a grinding disk or a cylindrical or a drum-shaped cutting bit as a movable trimming means or trimming device or trimmer. The grinding disk or the cutting bit are used to remove material from the surface causing the surface trimming by the surface trimming device. The trimming device can be for instance a grinding machine, a planning machine, an edge router, a palm router, a wood planner or the like. In particular, the trimming device can be designed for a manual use by a single operator. The usage of a drum-shaped cutting bit, for instance in a wood planner, facilitates the creation of a smooth surface during edge trimming. The drum-shaped cutting bit can have a thicker diameter in its center and a smaller diameter on both of its corners, so that more material is removed in the center of the cutting bit than on the corners creating a curved profile during edge trimming.

An operative trimming portion of the movable trimming means or trimming device or trimmer of a trimming device mounted to the fixation means or fixation device is located at least sectionally above the lower edges of the front side base portion and the backside base portion of the main body of the guiding tool. The lower edges of the front side base portion and the backside base portion are in contact to the workpiece during trimming. The entire operative trimming portion of the movable trimming means or trimming device or trimmer is located above the lower edges of the front side base portion and the backside base portion, so that a trimming occurs only in the areas between the lower edges of the front side base portion and the backside base portion, which are not contacting the surface of the workpiece. The distance of the operative trimming portion to the lower edges of the front side base portion and the backside base portion therefore determines the maximum surface roughness after surface trimming.

A minimum distance between the operative trimming portion and the lower edges of the front side base portion and the backside base portion is between 0.05 mm and 1 mm, or between 0.1 mm and 0.3 mm. By providing this minimum distance, an unintended removal of material from the surface is prevented, since the guiding tool of the trimming arrangement prevents a surface trimming once all edges and/or all structures protruding from the surface have been trimmed to a height that corresponds to the minimum distance between the operative trimming portion and the lower edges of the front side base portion. For the edge trimming of wind turbine blades, a minimum distance between 0.05 mm and 1 mm, or between 0.1 mm and 0.3 mm, is to obtain a smooth surface and to maintain the aerodynamic properties of the wind turbine blade after the application of a protective shell.

BRIEF DESCRIPTION

Some of the embodiments will be described in detail, with reference to the following figures, wherein like designations denote like members, wherein.

DETAILED DESCRIPTION

Figure 7:
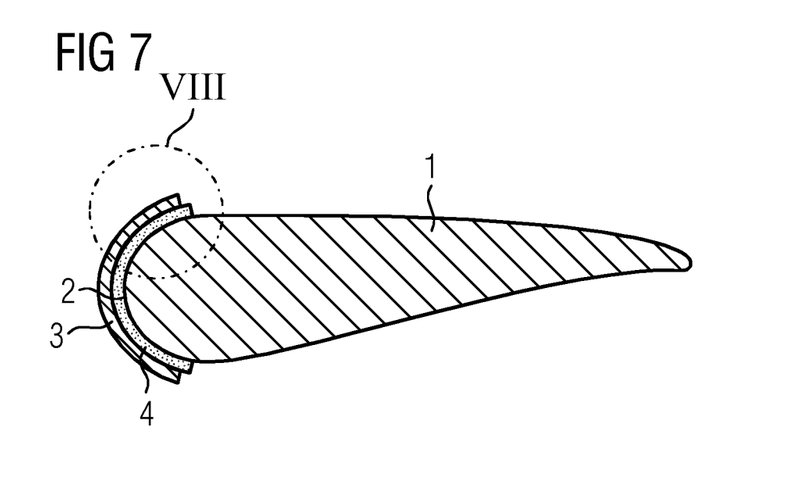
FIG. 7 shows a side view of protective shell mounted to a wind turbine blade.

In FIG. 7, a cross sectional view of a wind turbine blade 1 is shown. On a leading edge 2 of the wind turbine blade 1, a protective shell 3 is mounted to the wind turbine blade 1, wherein the protective shell 3 is attached to the surface of the wind turbine blade 1 using an adhesive layer 4. The protective shell 3 is made for instance of an elastomeric material and is used for protecting the leading edge 2 of the wind turbine blade 1 from erosion that occurs during operation of the wind turbine blade 1. The protective shell 3 can be mounted to the wind turbine blade 1 both during a fabrication of the wind turbine blade 1 and during a repair of an already operative wind turbine blade 1 that has been damaged by erosion during operation.

Figure 8:
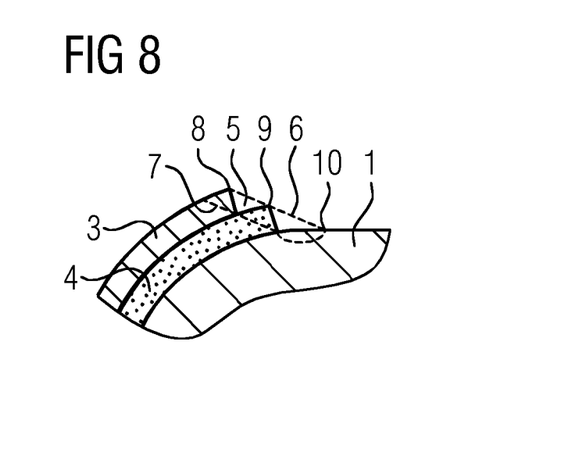
FIG. 8 shows a detail of the wind turbine blade shown in FIG. 7.

In FIG. 8, a detail of the wind turbine blade 1 is shown. To improve the aerodynamic properties of the wind turbine blade 1 after mounting of the protective shell 3, it is known to use edge filling for adding additional material 5 providing a smooth surface 6 of the wind turbine blade 1. Alternatively, it is possible to obtain a smooth surface 7 by trimming the edge 8 of the protective shell 3 and/or the edge 9 of the adhesive layer 4. However, a trimming of the edges 8, 9 can inflict surface damage to the wind turbine blade 1, for instance in a surface area 10 close to the edges 8,9 of the protective shell 3 and the adhesive layer 4, respectively.

Figure 1:
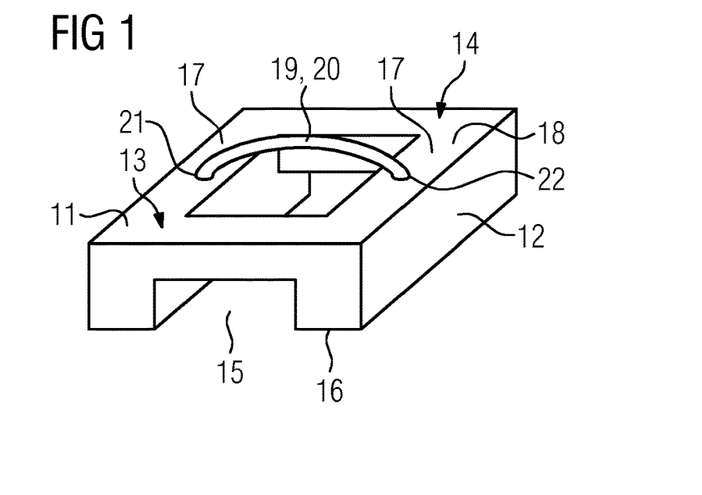
FIG. 1 shows a first embodiment of a guiding tool according to the invention.

In FIG. 1, a first embodiment of a guiding tool 11 according to embodiments of the invention is shown. By the usage of the guiding tool 11, damage in the surface area 10 of the wind turbine blade 1 during trimming of the surface can be prevented. The guiding tool 11 comprises a main body 12. The main body 12 comprises a front side base portion 13 and a backside base portion 14. The main body 12 exhibits a recess 15 on a bottom side 16 of the main body 12 between the front side base portion 13 and the backside base portion 14. The front side bases portion 13 and the backside base portion 14 are connected by two connection portions 17. The main body 12 forms a rectangular frame surrounding the recess 15. On a top side 18 of the main body 12, the main body 12 comprises a fixation means or fixation device 19. By the fixation means or fixation device 19, a trimming device can be mounted to the guiding tool 11. In this embodiment, the fixation means or fixation device 19 comprises a bracket 20, which is fixated at an end 21 to the surface 18 of the main body 12. The second end 22 of the bracket 20 can be attached reversibly to the top side 18 of the main body 12 for fixation of a mounted trimming device.

Figure 2:
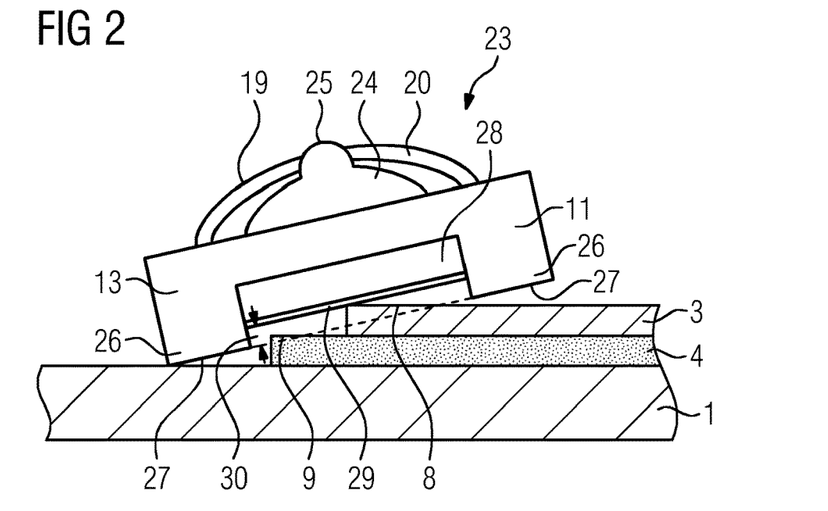
FIG. 2 shows a first embodiment of a trimming arrangement according to the invention.

In FIG. 2, a first embodiment of a trimming arrangement 23 according to embodiments of the invention is shown. The trimming arrangement 23 comprises the guiding tool 11 as depicted in FIG. 1 and a trimming device 24, which is mounted to the guiding tool 11. The trimming device 24 is attached to the guiding tool 11 by the fixation means or fixation device 19, wherein the bracket 20 of the fixation means or fixation device 19 is arranged through a handle 25 of the trimming device 24 fixating the trimming device 24 in the guiding tool 11. The front side base portion 13 of the guiding tool 11 comprises two contact portions 26, which are contacting the surface of the wind turbine blade 1 or the protective shell 3, respectively, on a lower edge 27 of the front side base portion 13. The backside base portion 14, which is not visible in FIG. 2, exhibits an equal shape to the front side base portion 13. The trimming device 24 comprises a trimming means or trimming device or trimmer 28 with an operative trimming portion 29 located at a lower edge of the movable trimming means or trimming device or trimmer 28. In this embodiment, the trimming device 24 is for instance a surface planning device, wherein the movable trimming means or trimming device or trimmer 28 is a cylindrical-shaped cutting bit, which rotates during operation of the trimming device 24.

The operative portion 29 of the movable trimming means or trimming device or trimmer 28 is located above the lower edge 27 of the front side base portion 13 and the backside base portion 14, respectively. The minimum distance 30 between the operative trimming portion 29 and the lower side 27 is between 0.05 mm and 1 mm, or between 0.1 mm and 0.3 mm. By using the trimming arrangement 23, the edges 8, 9 of the protective shell 3 and the adhesive layer 4, respectively, can be trimmed without risking the occurrence of surface damage to the wind turbine blade 1. A contact between the movable trimming means or trimming device or trimmer 28, especially of its operative trimming portion 29, and the surface of the wind turbine blade 1 is prevented due to the front side base portion 13 and the backside base portion 14. During the trimming process, the contact portions 26 stay in contact with the surface of the wind turbine blade 1 and the protective shell 3 their lower edges 27, so that an unintended contact between the movable trimming means or trimming device or trimmer 28 and the surface of the wind turbine blade 1 is prevented at all times.

Figure 3:
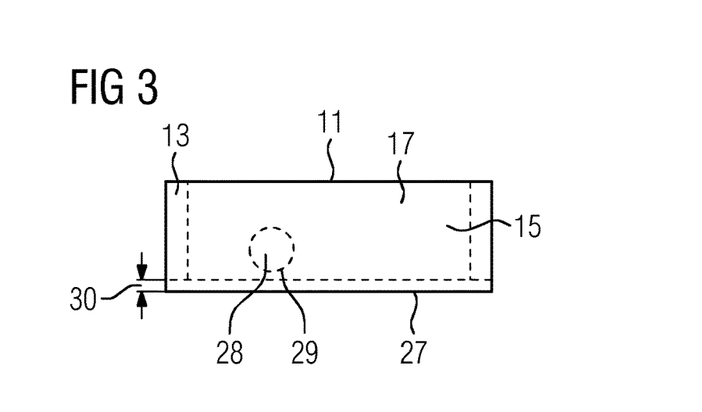
FIG. 3 shows a schematically side view of the first embodiment of the trimming arrangement according to the invention.

In FIG. 3, a schematical view of a cross section of the guiding tool 11 is shown. The movable trimming means or trimming device or trimmer 28, which is depicted schematically as a dashed circle, is located inside the recess 15 of the guiding tool 11. The operative trimming portion 29, which is for instance a blade protruding from the circumference of the movable trimming means or trimming device or trimmer 28, is located at a distance 30 above the lower edge 27 of the contact portions 26 of front side base portion 13 or the backside base portion 14 or the lower edge of the connection portion 17, respectively. It may be provided that the fixation means or fixation device 19 is height-adjustable, so that the distance 30 can be varied. The fixation means or fixation device 19 can also be adjustable, so that different types of trimming devices can be mounted to the guiding tool 11.

Figure 4:
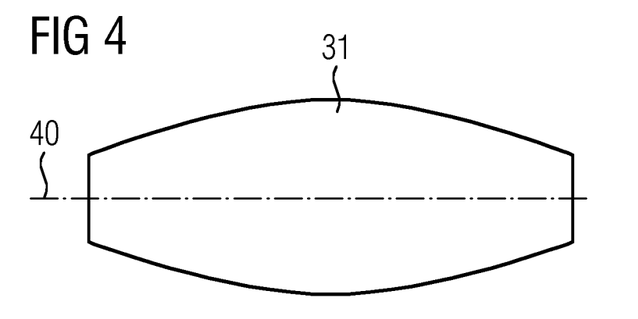
FIG. 4 shows a movable trimming means or trimming device or trimmer of a trimming device of a trimming arrangement according to the invention.

In FIG. 4, a drum-shaped movable trimming means or trimming device or trimmer 31 is shown. The drum-shaped movable means 31 can be used as a replacement for the cylindrical-shaped movable trimming means or trimming device or trimmer 28 shown in FIG. 2 or FIG. 3. Due to the drum-shape of the movable trimming means or trimming device or trimmer 31 more material is removed in the center of the movable trimming means or trimming device or trimmer 31 than towards the edges when rotating around an axis 40. This facilitates the creation of a smooth surface during edge trimming of the wind turbine blade 1.

Figure 5:
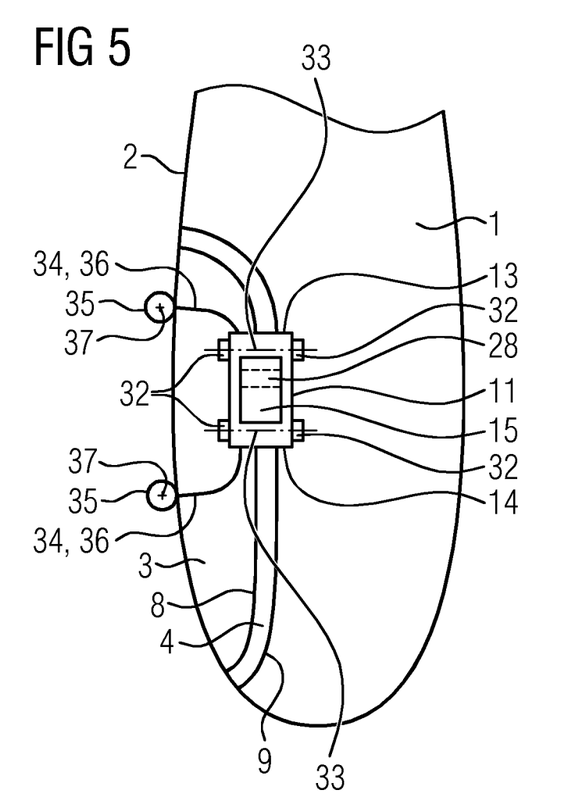
FIG. 5 shows a second embodiment of a guiding tool according to the invention.

In FIG. 5, a second embodiment of a guiding tool 11 according to embodiments of the invention is shown. The guiding tool 11 comprises four first guiding rollers 32, which are attached to the front side base portion 13 and the backside base portion 14 of the guiding tool 11. The first guiding rollers 32 are rotatable around first parallel axes 33. In this embodiment, the first guiding rollers 32 are forming the contact portions 26 of the front side base portion 13 and the backside base portion 14, so that the guiding tool 11 is in contact to the surface of the wind turbine blade 1 with a part of the circumference of each of the first guiding rollers 32. Hence, the lower edge of the outer circumference of the guiding rollers 32 is forming the lower edge 27 of both the front side base portion 13 and the backside base portion 14. The position of a movable trimming means or trimming device or trimmer 28 in the recess 15, while a trimming device 24 is mounted to the guiding tool 11, is schematically depicted by the dashed lines. For enabling a precise guiding along the edges 8, 9 of the protective shell 3 and the adhesive layer 4, respectively, the guiding tool 11 comprises two guiding means 34, wherein each guiding means 34 comprises a second guiding roller 35 and a connection arm 36, wherein the second guiding roller 35 is attached to the connection arm 36 of the guiding means 34. The second guiding roller 35 is rotatable around a second axis 37, which is arranged under an angle to the first axis 33. Due to the guiding means 34, the guiding tool 11 can be guided at least sectionally along the leading edge 2 of the wind turbine blade 1 facilitating an edge trimming of the edges 8, 9. The connection arms 36 can be adjustable, so that a distance between the second guiding rollers 35 and the main body 12 of the guiding tool 11 can be adjusted. Also, by adjusting the connection arms 36, the angle between the second axis 37 and the first axis 33 can be adapted. This facilitates the usage of the guiding tool 11 on different types of wind turbine blades 1, which can have for instance different shapes or different curvatures of their leading edge 2.

Figure 6:
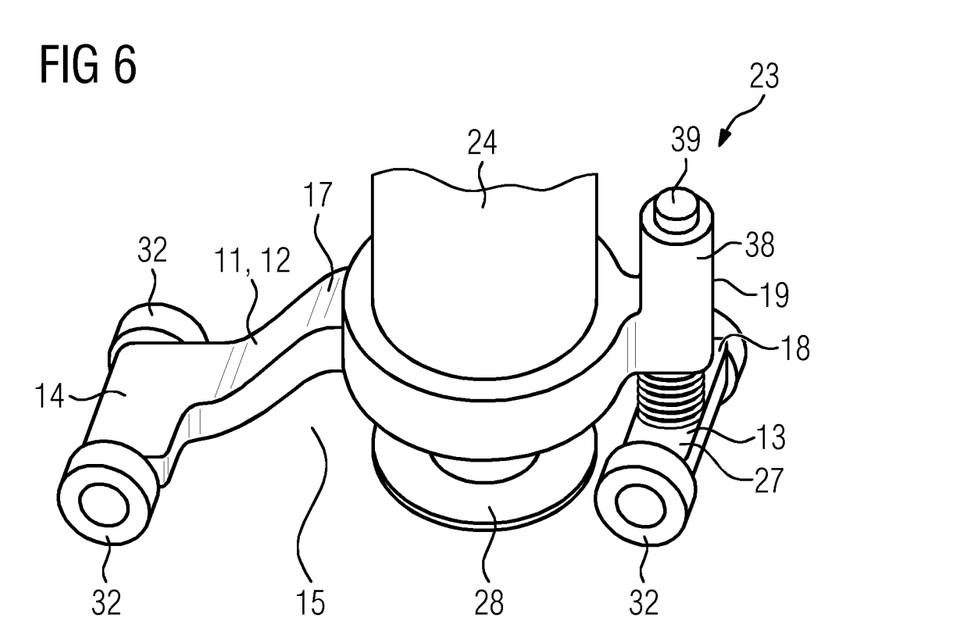
FIG. 6 shows a second embodiment of a trimming arrangement comprising a third embodiment of a guiding tool according to the invention.

In FIG. 6, the second embodiment of a trimming arrangement 23 is shown. The guiding tool 11 comprises a main body 12, wherein the main body 12 comprises a front side base portion 13 and a backside base portion 14 connected by a connection portion 17. On the top side 18 of the main body 12, a fixation means or fixation device 19 is mounted, where the fixation means or fixation device 19 comprises a clamp 38. With the clamp 38, a trimming device 24 is attached to the guiding tool 11. The clamp 38 can be adjustable in diameter, so that different types of trimming devices 24 can be mounted to the guiding tool. In this embodiment of a trimming arrangement 23, the trimming device 24 is a router, which comprises a grinding disk as movable trimming means or trimming device or trimmer 28. The movable trimming means or trimming device or trimmer 28 of the trimming device 24 is arranged inside a recess 15 between the front side base portion 13 and the backside base portion 14. The fixation means or fixation device 19 comprises a screw 39, wherein the screw 39 can be used to adjust the height of the fixation means or fixation device 19 and therefore a distance between the grinding movable trimming means or trimming device or trimmer 28 and the lower edge 27 of the front side base portion 13 and the backside base portion 14. The lower edge 27 of the front side base portion 13 and the backside base portion 14 is in this embodiment the lower edge of the outer circumference of the first guiding rollers 32 forming contact portions 26 of the front side base portion 13 and the backside base portion 14. Since the front side base portion 13 and the backside base portion 14 expand beyond the movable trimming means or trimming device or trimmer 28 in a lateral direction of the guiding tool 11, an unintended contact between the surface trimming means or trimming device or trimmer 28 and the surface of the wind turbine blade 1 can be prevented. In this embodiment, the first guiding rollers 32 are implemented as roller bearings, that are attached to the front side base portion 13 and the backside base portion 14.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A guiding tool for a surface trimming device for trimming a protective layer and/or an adhesive layer on a wind turbine blade, the guiding tool comprising:

a main body with a front side base portion and a backside base portion, which are connected by two connection portions of the main body, so as to form a rectangular frame, wherein the main body comprises a recess on a bottom side between the front side base portion and the backside base portion and a fixation device on a top side of the main body opposing the recess and between the front side base portion and the backside base portion, wherein a surface trimming device is mountable to the fixation device in such manner that a movable trimming device of the surface trimming device is located in the recess between the front side base portion and the backside base portion, wherein the front side base portion and the backside base portion comprise a contact portion for contacting a surface of the wind turbine blade during trimming.

2. The guiding tool according to claim 1, wherein the front side base portion and the backside base portion each comprises a left and a right contact portion for contacting the surface of the wind turbine blade during trimming.

3. The guiding tool according to claim 1, wherein the fixation device is height-adjustable, so that a distance between an operative trimming portion of the movable trimming device and the lower edges of the front side base portion and the backside base portion is adjustable.

4. The guiding tool according to claim 1, wherein the fixation device is adaptable for fixation of different trimming devices.

5. The guiding tool according to claim 2, wherein the front side base portion and the backside base portion each comprises at least one first guiding roller forming the respective left and right contact portions.

6. The guiding tool according to claim 5, wherein the main body comprises at least one guiding means comprising at least one second guiding roller attached to a connection arm of the guiding means, so that the second guiding roller is arranged distanced to the main body.

7. The guiding tool according to claim 5, wherein the first guiding rollers are rotatable around first parallel axes and the second guiding roller is rotatable around a second axis arranged at an angle to the first axes.

8. The guiding tool according to claim 6, wherein the connection arm is adaptable for adjusting the distance between the at least one second guiding roller and the main body and/or for adjusting the angle between the second axis or axes of the at least one second guiding roller and the first axes.

9. A trimming arrangement comprising the guiding tool according to claim 1 and a trimming device.

10. The trimming arrangement according to claim 9, wherein the trimming device comprises a grinding disk or a cylindrical or a drum-shaped cutting bit as a movable trimming device.

11. The trimming arrangement according to claim 9, wherein an operative trimming portion of the movable trimming device of a trimming device mounted to the fixation device is located at least sectionally above the lower edges of the front side base portion and the backside base portion of the main body of the guiding tool.

12. The trimming arrangement according to claim 11, wherein a minimum distance between the operative trimming portion and the lower edges of the front side base portion and the backside base portion is between 0.05 mm and 1 mm or between 0.1 mm and 0.3 mm.

13. A guiding tool for a surface trimming device for trimming a wind turbine blade, comprising:
a main body with a front side base portion and a backside base portion, which are connected by two connection portions of the main body to form a frame, wherein the main body includes a recess on a bottom side between the front side base portion and the backside base portion and a fixation device on a top side of the main body opposing the recess and between the front side base portion and the backside base portion, wherein a surface trimming device is mountable to the fixation device in such manner that a movable trimming device of the surface trimming device is located in the recess between the front side base portion and the backside base portion, wherein at least one of the front side base portion and the backside base portion comprise a contact portion for contacting a surface of the wind turbine blade during trimming, wherein the front side base portion and the backside base portion each comprises at least one first guiding roller forming the contact portion, and wherein the main body comprises at least one guiding means comprising at least one second guiding roller attached to a connection arm of the guiding means, so that the second guiding roller is arranged distanced to the main body.

* * * * *